(12) United States Patent
Pandura et al.

(10) Patent No.: US 8,456,805 B2
(45) Date of Patent: Jun. 4, 2013

(54) SUPPORT PART

(75) Inventors: Michael Pandura, Bietigheim-Bissingen (DE); Martin Frank, Muehlacker (DE); Gerd Héckel, Moetzingen (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 278 days.

(21) Appl. No.: 13/012,014

(22) Filed: Jan. 24, 2011

(65) Prior Publication Data

US 2011/0182032 A1  Jul. 28, 2011

(30) Foreign Application Priority Data

Jan. 23, 2010 (DE) .......... 10 2010 005 485

(51) Int. Cl.
*H05K 7/20* (2006.01)

(52) U.S. Cl.
USPC ........... 361/600; 296/70; 296/187.3; 361/690

(58) Field of Classification Search
None
See application file for complete search history.

(56) References Cited

U.S. PATENT DOCUMENTS

| 6,388,881 | B2 * | 5/2002 | Yamauchi et al. | 361/704 |
| 6,505,876 | B1 * | 1/2003 | Watanabe | 296/70 |
| 6,709,041 | B1 * | 3/2004 | Hotary et al. | 296/70 |
| 7,021,691 | B1 * | 4/2006 | Schmidt et al. | 296/70 |
| 7,264,294 | B2 | 9/2007 | Gresham et al. | |
| 7,926,845 | B2 | 4/2011 | Sato | |
| 2007/0210616 | A1 * | 9/2007 | Wenzel et al. | 296/187.03 |

FOREIGN PATENT DOCUMENTS

| DE | 198 07 309 | 8/1999 |
| DE | 10 2006 008 039 | 8/2008 |
| JP | 4124486 | 11/1992 |
| JP | 2002096657 | 4/2002 |
| JP | 2005075087 | 3/2005 |
| JP | 2009161150 | 7/2009 |

* cited by examiner

*Primary Examiner* — Gregory Thompson
(74) *Attorney, Agent, or Firm* — Gerald E. Hespos; Michael J. Porco; Matthew T. Hespos

(57) ABSTRACT

A support part serves is arranged in an instrument panel of a motor vehicle to hold a vehicle data display unit having an integrated navigation or radio unit. The support part has a single-piece frame composed of a magnesium pressure die cast material with a central holding frame for the unit and lateral holding frames for the air outlets. The support part is connected at one side to the instrument panel and another side to the cockpit cross member. Centering receptacles for the unit and further centering receptacles for the air outlets are arranged in the central holding frame and in the two lateral holding frames. Centering elements are arranged on the unit and on the air outlet correspondingly to the centering receptacles of the holding frames.

11 Claims, 6 Drawing Sheets

SUPPORT PART

CROSS-REFERENCE TO RELATED APPLICATION

This application claims priority under 35 USC 119 to German Patent Application No. 10 2010 005 485.2, filed on Jan. 23, 2010, the entire disclosure of which is incorporated herein by reference.

BACKGROUND OF THE INVENTION

1. Field of the Invention

The invention relates to a support part for holding a vehicle data display unit.

2. Description of the Related Art

DE 10 2006 008 039 B4 discloses a central console for an instrument panel of a motor vehicle. The central console has a central panel with lateral air outlets and also has an insertable front panel with cutouts. Furthermore, DE 198 07 309 A1 discloses an instrument panel for a motor vehicle having a basic body, a paneling and a multiplicity of display instruments, control elements and air outlets.

It is an object of the invention to provide a support part for holding a vehicle data display unit, a navigation unit and a radio unit. It is a further object of the invention to provide a support part to ensure that the units and air outlets are held centrally with a reduction of joint tolerances between the components.

SUMMARY OF THE INVENTION

The invention relates to a support part formed as a structure-reinforcing component of the instrument panel and with a receptacle and centering means for the unit and the air outlets. The support part comprises an integral or unitary frame with a central holding frame for the unit and laterally adjoining holding frames for the air outlets. The support part is connected at one side to the instrument panel and at the other side to a cockpit cross. Centering receptacles for the unit and further centering receptacles for the air outlets are arranged in the central holding frame and in the two lateral holding frames.

The frame of the support part preferably has at least four fastenings to the instrument panel on a top frame section of the central and lateral holding frames and at least two further fastenings on a lower outer frame section of the lateral holding frames. Fastening angle brackets are arranged on the lateral holding frames in the lower outer frame section and can be connected to the cockpit cross member. The fastening angle brackets preferably are arranged with a gap clearance to the lateral outer frame section and attached at the top side with a limb to the holding frame.

The unit preferably is fastened and securely positioned to the central holding frame at least at four fastening points arranged in corner points of the frame. The support part thus is fixed both to the instrument panel and to the cockpit cross member to ensure a stable attachment and to reinforce the structure of the instrument panel. The attachment of the fastening angle bracket with a gap clearance to the lateral holding frame obtains a certain weakening of the attachment and achieves a reduction in the head impact values.

Opposite centering receptacles for centering elements of the unit are arranged at the inside in lateral walls in the central holding frame of the support part to hold the unit centrally. The centering receptacles comprise U-shaped slide-in grooves that run in the longitudinal direction of the holding frame and that position the unit in the vertical direction (z direction). The U-shaped centering receptacles enable the unit to be pushed into the support part from the front, and the centering elements hold the unit precisely in the vertical direction.

A molding preferably is arranged on the top edge and has a centering receptacle that receives a centering element of the unit for further centering the unit in the central holding frame. The centering receptacle holds the unit in position in the transverse direction (y direction). Furthermore, a downwardly projecting bracket preferably is formed integrally on the bottom edge section of the central holding frame. The bracket has a rectangular slot opening arranged to receive a positioning pin on a central console of the instrument panel. The positioning pin projects in a retentive fashion into the slot opening and holds the unit centered in the vehicle transverse direction (y direction). Thus, the central console of the instrument panel is centered with respect to the support part to achieve a precise alignment of the two components with respect to one another.

Centering receptacles for the air outlets preferably are formed integrally on a side wall of the central holding frame so that the air outlets can be inserted with a precise joint dimension. The centering receptacles comprise an upper opening and a groove-like depression arranged therebelow. Centering elements project in the vertical direction (z direction) and in the longitudinal direction (x direction) of the air outlet and engage the centering receptacles to position the air outlets.

The centering elements for the air outlets may comprise two spaced-apart cams arranged on the wall opposite the side wall or on the frame section of the lateral holding frame. The cams engage into recesses or some other receptacles on the air outlet and accurately position the air outlet in the transverse direction (y direction). The centering elements enable optimum alignment in the support part and in the lateral holding frames in all directions.

U-shaped centering lugs preferably are provided on the outer frame of the unit for accurately positioning the air outlets The centering lugs are inserted in and held by a frame of the air outlets. Furthermore, the air outlets are held by latching connections or spring clamps with the support part in the lateral holding frame.

An exemplary embodiment of the invention is illustrated in the drawings and is described in more detail below.

DETAILED DESCRIPTION OF THE PREFERRED EMBODIMENT

Figure 1:
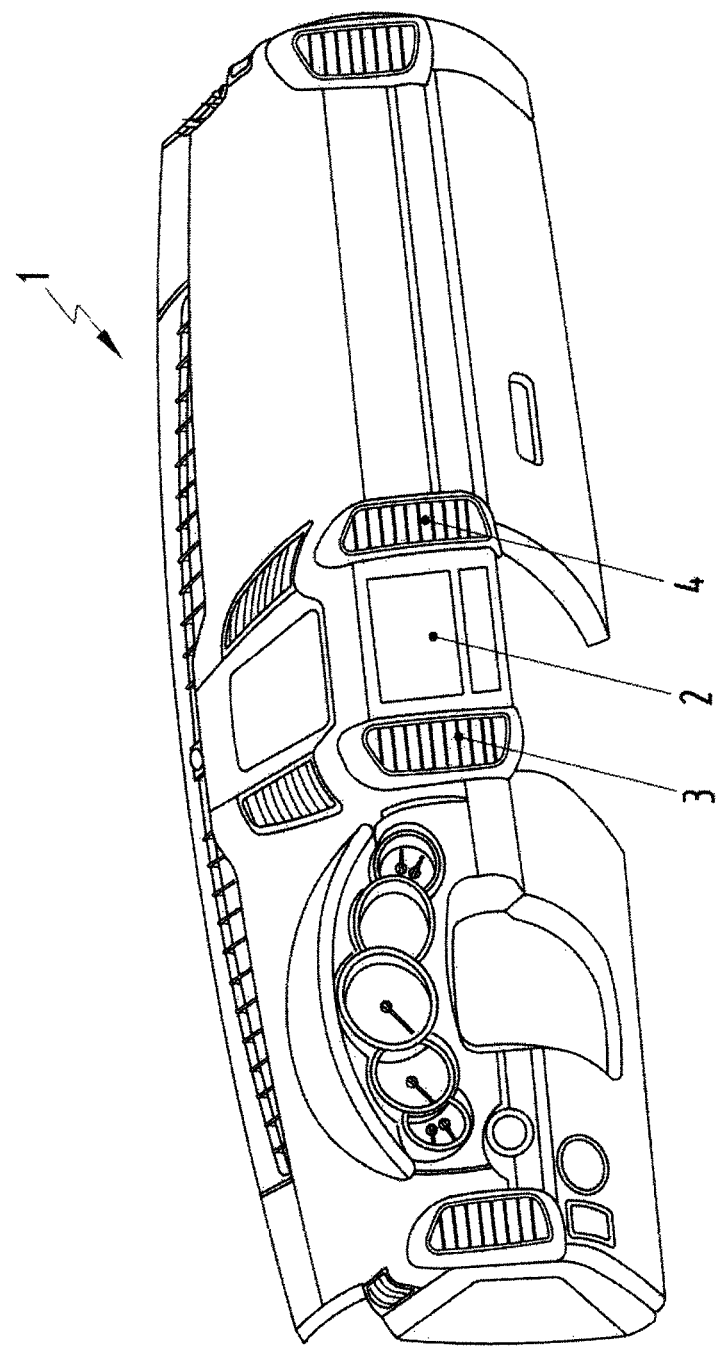
FIG. 1 is a diagrammatic illustration of an instrument panel of a motor vehicle with inserted unit and lateral air outlets.
Figure 2:
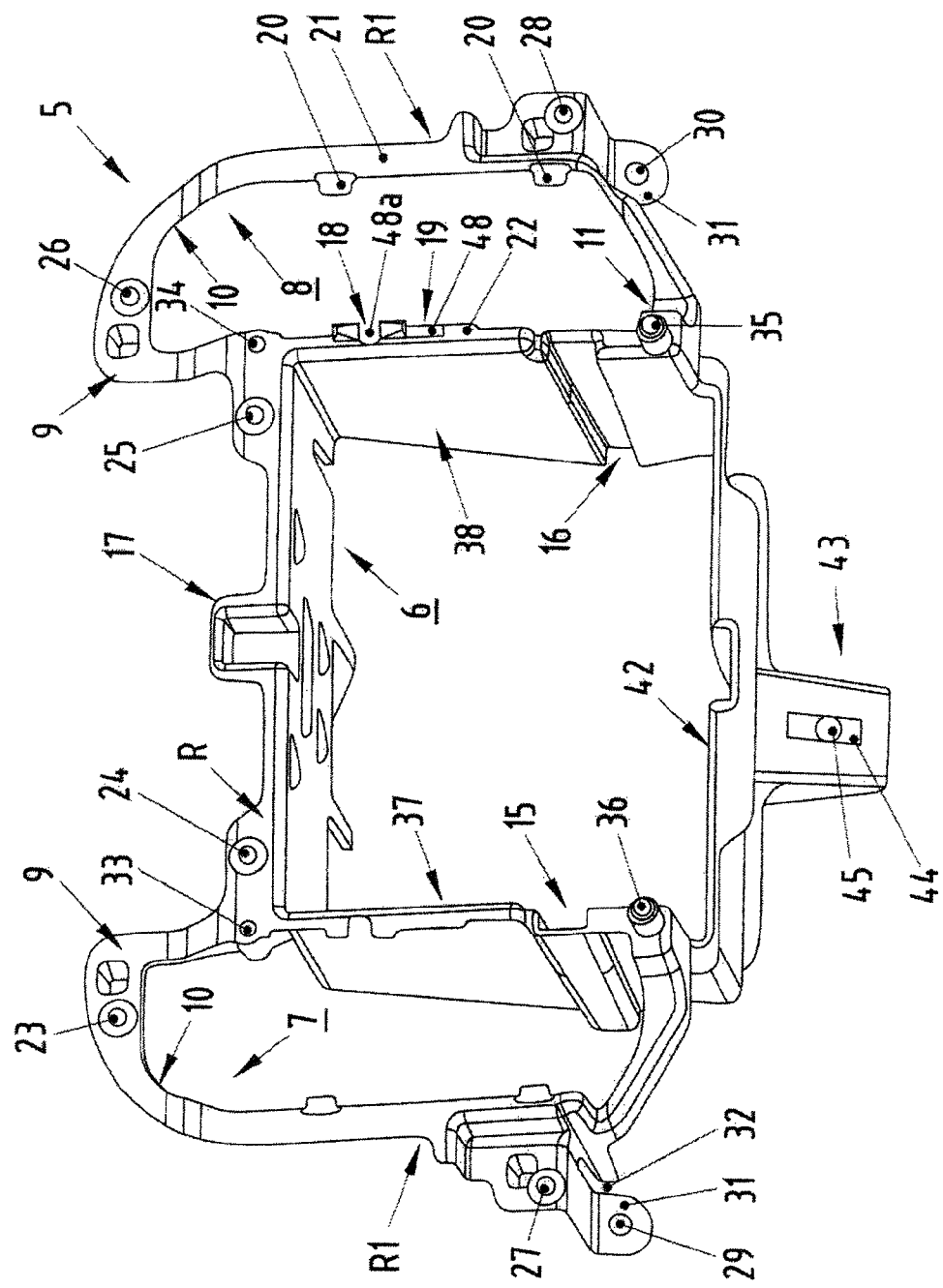
FIG. 2 is a front view of a support part.
Figure 3:
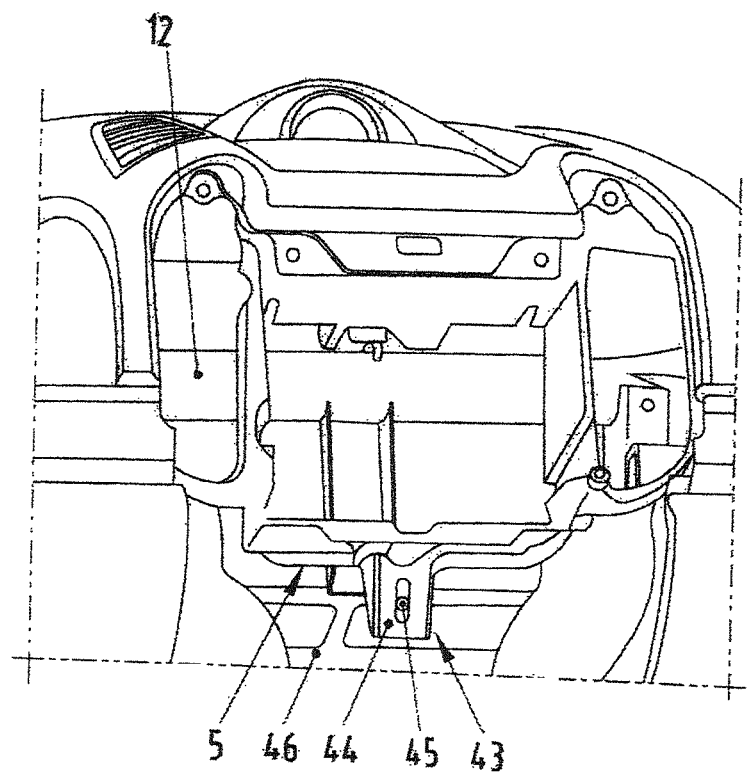
FIG. 3 is a view of the support part inserted into the instrument panel.

An instrument panel for an automotive vehicle is identified by the numeral 1 in FIG. 1 and has a navigation and radio unit 2 inserted therein. Air outlets 3, 4 are arranged at the sides of the unit 2. The components 2, 3 and 4 are held fastened in a support part 5, which is illustrated in FIGS. 2 and 3.

The support part 5 is an integral or unitary frame with a rectangular center holding frame 6 for the unit 2. The support part 5 further includes side holding frames 7, 8 adjoined to the sides of the center holding frame 6. The side holding frames 7, 8 are configured for holding the air outlets 3, 4. Sections 9 extend up from each side holding frame 7, 8 beyond the center holding frame 6. The sections 9 are in the shape of an upright rectangle with rounded areas 10, 11. The support part preferably is formed as a pressure die cast component to achieve an increase in stiffness and may be formed from a light metal, such as aluminum or magnesium. The rigid support part ensures dimensional accuracy of the joints of adjoining components. The rigid support part also functions to reliably hold the components fastened therein in the event of a crash.

The support part 5 is connected to a cockpit cross member 12 of the vehicle body and also to the instrument panel 1 by screw means or similar fastening means.

Centering receptacles 15, 16, 17 are provided in the central holding frame 6 for the positioned, centered insertion of the unit 2 into the support part 5. Similarly, centering receptacles 18, 19 are provided on the lateral frame sides 21 and 22 for the positioned, centered insertion of the air outlets 3, 4 into the lateral holding frames 7 and 8.

The frame of the support part 5 is connected to the instrument panel 1 by at least four upper fastening points 23, 24, 25 and 26 and two lower fastening points 27, 28. The four upper fastening points 23 to 26 are provided in an upper frame section R and the two lower fastening points 27 and 28 are provided on an outer frame section R1 of the lateral holding frames 7 and 8. Furthermore, fastening angle brackets 31 are arranged on the outer frame section R1 and are connected to the cockpit cross member 12 at fastening points 29 and 30. The fastening angle brackets 31 are arranged with a gap clearance 32 with respect to the frame section R1 so that the support part 5 can more easily break away or deform in the event of a head impact.

Figure 4:
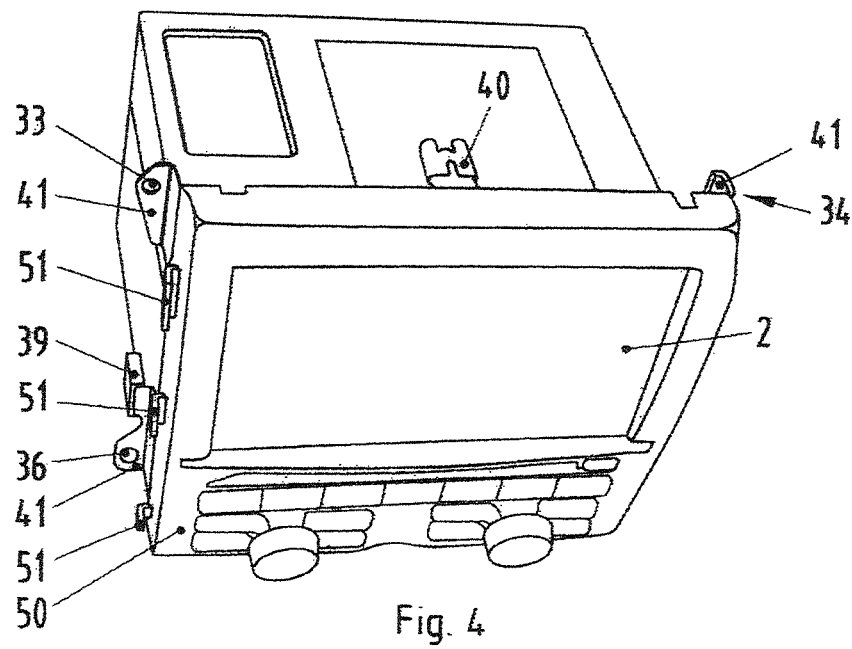
FIG. 4 is a view of the unit with centering elements and with angled receptacles for the air outlets arranged on the outer frame.
Figure 5:
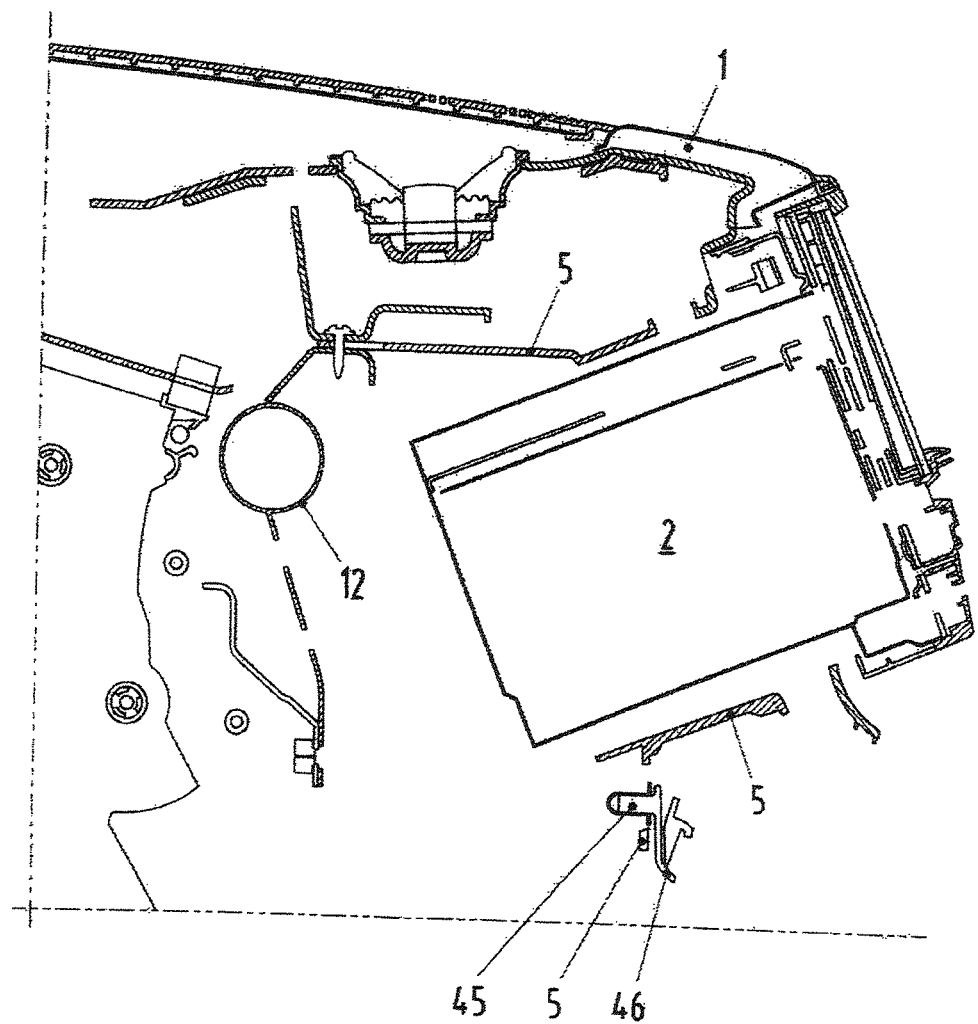
FIG. 5 is a vertical section through the instrument panel with support part and inserted unit.

As illustrated in FIG. 4, the unit 2 is held on the support part 5 at least at four fastening points 33, 34, 35 and 36 by angle brackets 41 arranged at the corners of the central holding frame 6.

The centering receptacles 15 and 16 on the central holding frame 6 are arranged opposite one another at the inside in lateral walls 37, 38. The centering receptacles 15, 16 are inwardly open U-shaped slide-in grooves that run in the longitudinal direction of the holding frame 6. Centering elements 39 of the unit 2 engage into said centering receptacles 15, 16 and center the unit 2 in the vertical direction (z direction).

Figure 6:
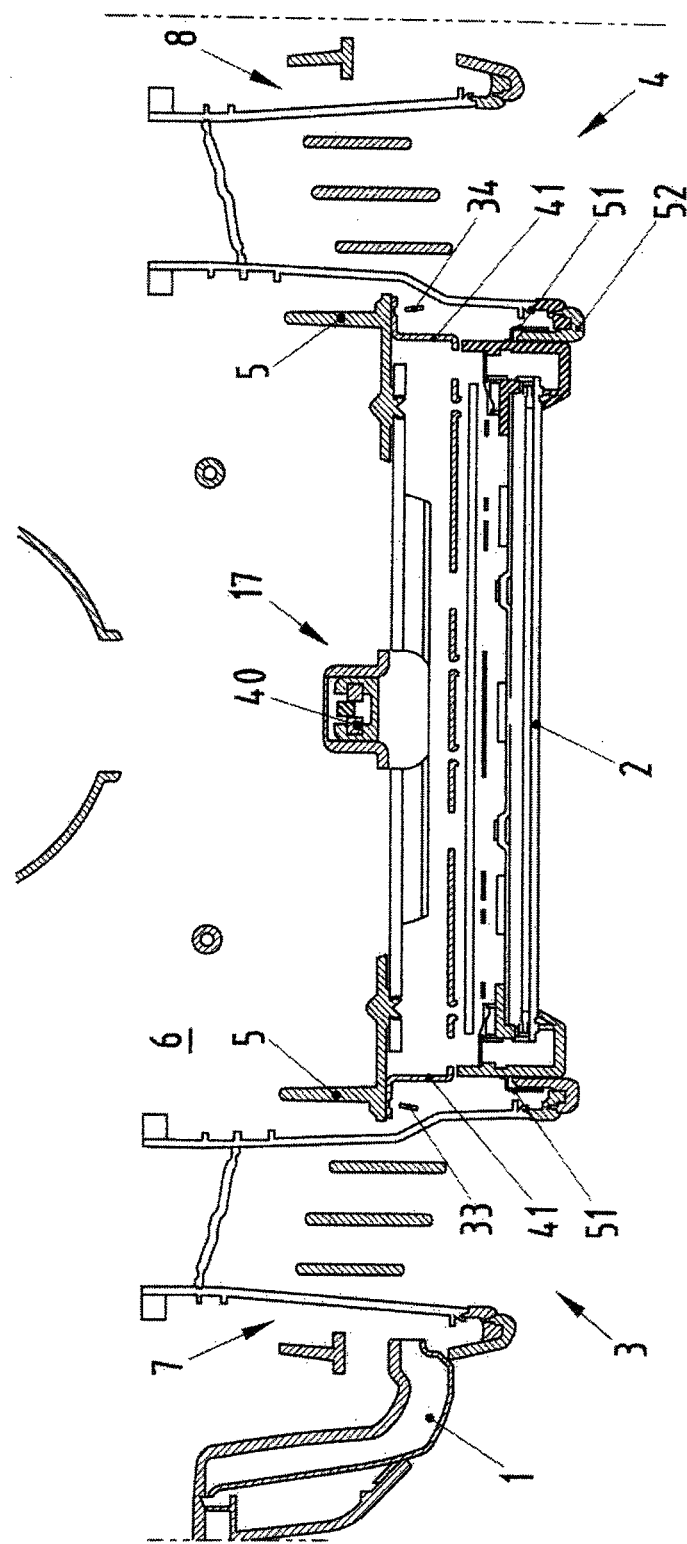
FIG. 6 is a horizontal section through the upper outer frame of the unit inserted in the support part, with lateral air outlets.

As shown in FIG. 6, an outwardly projecting central molding or bracket is arranged on the upper frame section R of the central holding frame 6 and functions as a centering receptacle 17 for receiving a centering element 40 of the unit 2. The centering receptacle 17 engages and positions the unit 2 in the transverse direction (y direction).

A downwardly projecting bracket 43 is formed integrally on the lower edge section 42 of the central holding frame 6 and has a rectangular slot opening 44. The slot opening 44 is arranged correspondingly with respect to a positioning pin 45 on a central console 46 of the instrument panel 1. In the assembled state, the positioning pin 45 engages into the slot opening 44 and centers the unit 2 in the vehicle transverse direction (y direction).

Figure 7:
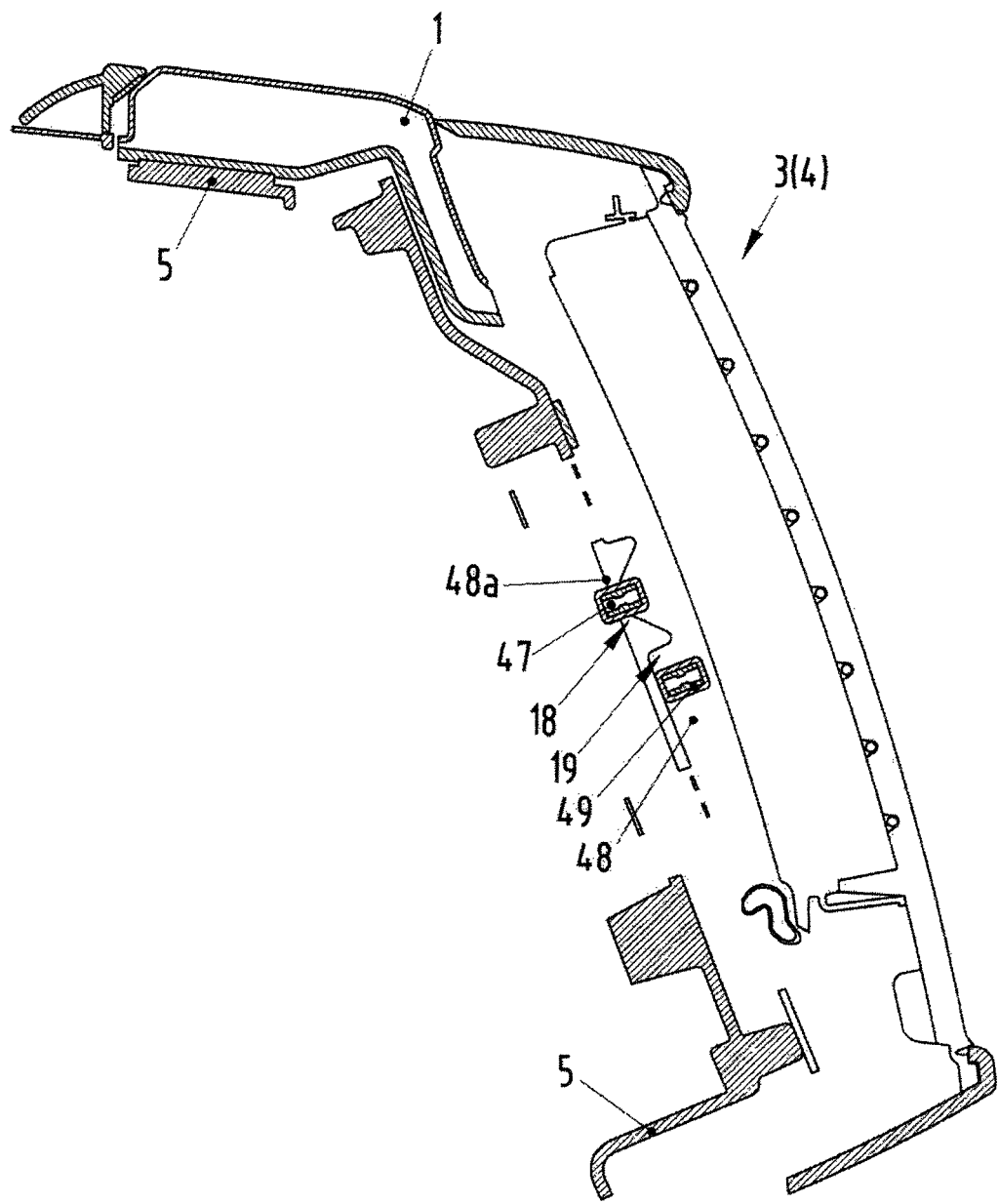
FIG. 7 is a vertical section through an air outlet inserted in the support part.

As illustrated in FIG. 7, the centering receptacles 18, 19 for the air outlets 3, 4 are arranged on a side wall 22 of the central holding frame 6. One centering receptacle 18 has an opening 48a for engaging a centering element 47 of the air outlet 3, 4. The other centering receptacle 19 has a recessed indentation 48 for engaging a further centering element 49 of the air outlet 3, 4. The centering receptacles 18, 19 and the associated centering elements 47, 49 hold the air outlets 3, 4 centered in the vertical direction (z direction) and in the longitudinal direction (x direction). Two mutually spaced-apart projecting cams 20 are arranged on the opposite frame 21 of the support part 5 and engage into correspondingly opposing recesses or similar holding elements to hold the air outlets 3, 4 accurately in position in the transverse direction (y direction).

An edge of the frame 52 of the air outlet 3, 4 is pushed into U-shaped centering lugs 51 from the front to fasten the air outlets 3, 4 to the outer frame 50 of the unit 2. Latching connections, spring clamps or some other connecting elements fixedly connect the air outlet 3, 4 to the support part 5 or the holding frame 7, 8.

What is claimed is:

1. A support part for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, a top frame section formed on the central and lateral holding frames having at least four upper fastenings for fastening the support part to the instrument panel, the lateral holding frames further having lower outer frame sections with at least two further fastenings for fastening the support panel to the instrument panel, and unit centering receptacles for the data display unit being arranged in the central holding frame and air outlet centering receptacles for the air outlets being arranged in the lateral holding frames.

2. The support part of claim 1, wherein the lower outer frame sections of the lateral holding frames have fastening angle brackets connected to the cockpit cross member.

3. The support part of claim 2, wherein the fastening angle brackets are arranged with a gap clearance to the lateral outer frame sections and are attached at a top side by a limb to the holding frame.

4. The support part of claim 1, wherein the frame of the support part is made of a magnesium pressure die cast material and with the instrument panel forms a structure-reinforcing component.

5. A support part for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, unit centering receptacles for the data display unit being arranged in the central holding frame and air outlet centering receptacles for the air outlets being arranged in the lateral holding frames, wherein the data display unit is fastened to the central holding frame at least at four fastening points arranged in corners of the frame.

6. A support part, for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, unit centering receptacles for the data display unit being arranged in the central holding frame and air outlet centering receptacles for the air outlets being arranged in the lateral holding frames, the unit centering receptacles comprising lateral unit centering receptacles arranged at inside positions in lateral walls in the central holding frame for engaging centering elements of the data display unit, the centering receptacles comprising U-shaped slide-in grooves that run in a longitudinal direction of the central holding frame and that hold the data display unit in position in a vertical direction.

7. A support part for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, unit centering receptacles for the data display unit being arranged in the central holding frame and air outlet centering receptacles for the air outlets being arranged in the lateral holding frames, the unit centering receptacles comprises a top unit centering receptacle arranged on a top frame section of the central holding frame for engaging a centering element of the unit, the top unit centering receptacle holding the data display unit in position in a transverse direction.

8. A support part, for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, unit centering receptacles for the data display unit being arranged in the central holding frame and air outlet centering receptacles for the air outlets being arranged in the lateral holding frames and a downwardly projecting bracket integrally formed on a bottom edge section of the central holding frame, the bracket having a rectangular, vertically aligned slot opening arranged correspondingly with respect to a positioning pin on a central console of the instrument panel, the slot opening being configured for retaining the positioning pin to hold the data display unit centered in a vehicle transverse direction.

9. A support part for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, unit centering receptacles for the data display unit being arranged in the central holding frame and air outlet centering receptacles are formed integrally on a side wall of the central holding frame and include an upper opening and a groove below the upper opening, and centering elements projecting in a vertical direction and a longitudinal direction of the air outlets engaging into the air outlet centering receptacles to position the air outlets.

10. The support part of claim 9, further comprising two spaced-apart cams arranged on a wall of the lateral holding frame opposite the side wall for centering the air outlets.

11. A support part A support part for holding a data display unit of a vehicle, the data display unit having an integrated navigation unit or radio unit, the support part having a first side connected to the instrument panel of the vehicle and a second side connected to a cockpit cross member of the vehicle, air outlets being arranged at sides of the data display unit, the support part comprising: a single-piece frame with a central holding frame for holding the data display unit and lateral holding frames for the air outlets laterally adjoining the central holding frame, unit centering receptacles for the data display unit being arranged in the central holding frame and air outlet centering receptacles for the air outlets being arranged in the lateral holding frames, and forwardly open U-shaped centering lugs arranged on an outer frame of the unit, frames of the air outlets being engaged in the centering lugs for centering the air outlets.

* * * * *